United States Patent [19]

Rowland

[11] Patent Number: 5,617,247
[45] Date of Patent: Apr. 1, 1997

[54] LIGHT SIGNALING DEVICE

[75] Inventor: William P. Rowland, Southington, Conn.

[73] Assignee: Reflexite Corporation, Avon, Conn.

[21] Appl. No.: 634,980

[22] Filed: Apr. 19, 1996

[51] Int. Cl.$^6$ ........................................ G02B 5/12
[52] U.S. Cl. ...................... 359/515; 359/527; 359/529; 116/20
[58] Field of Search ........................... 359/515, 527–530, 359/537, 546, 900; 116/18, 20

[56] References Cited

U.S. PATENT DOCUMENTS

| 2,504,982 | 4/1950 | Hunter | 116/20 |
|---|---|---|---|
| 2,589,618 | 3/1952 | Learned | 116/20 |
| 2,621,623 | 12/1952 | Thompson | 116/20 |
| 2,698,596 | 1/1955 | Morgan | 116/20 |
| 3,164,124 | 1/1965 | Ehrsam | 116/20 |
| 4,024,828 | 5/1977 | Knoll et al. | 116/20 |
| 4,065,204 | 12/1977 | Lipkins | 350/102 |
| 4,181,766 | 1/1980 | Williams et al. | 428/216 |
| 4,755,425 | 7/1988 | Huang | 428/331 |
| 5,528,421 | 6/1996 | Kashibuchi | 359/515 |

*Primary Examiner*—James Phan
*Attorney, Agent, or Firm*—Hamilton, Brook, Smith & Reynolds, P.C.

[57] ABSTRACT

A method and apparatus is described for producing a signaling device which uses sunlight or moonlight to signal a target by retroreflecting light through a window provided on the light reflective material of a mirror. A specular light reflective material with an opening coincident with the first opening is provided on the light reflective side of the mirror to aid in alignment of the mirror with the target.

11 Claims, 1 Drawing Sheet

LIGHT SIGNALING DEVICE

BACKGROUND OF THE INVENTION

This invention relates generally to signaling devices or implements and more particularly to a signaling device which reflects the rays of the sun or moon to signal a message to a target or object, which signal is to be read by an individual generally at or on the target.

The signaling device of the present invention permits the user to be assured that the reflections from a reflective surface or mirror are being properly directed or aimed to the recipient of the message. The mere utilization of a mirror for signaling does not guarantee that the reflective band of light is being properly directed to the individual who has to read and decode same. In normal practice the receiver of the message is at a great distance from the individual sending the message, such that the sender is not totally sure that he is transmitting the signal to the target such that the receiver can properly receive and interpret same.

Various types of signaling devices have been devised which rely on a source of natural light, such as, sunlight or moonlight to reflect signals of light to a remote target. One of the difficulties associated with such devices is the problem of quickly aligning the reflected light with the target.

SUMMARY OF THE INVENTION

In accordance with the present invention, misalignment of the reflected light beam is readily achieved by providing a specular surface on the back of a light signaling mirror. The mirror is comprised of an outer transparent substrate, such as glass, and an inner opaque reflective layer, such as silver. A square opening is made in the reflective layer leaving a bare transparent window. A retroreflector is disposed opposite the window to retroreflect light passing through the window. The specular surface is disposed on the back of the reflective layer and surrounds the window.

The window acts as a beam divider. When the mirror is aligned with the source and a target, the source light beam is split into two beams by the window. One beam is reflected toward the target. The other beam passes through the window and is retroreflected back to the window where it is split again. One of the beams goes to the eyes of the observer, while the other is returned toward the source, e.g., the sun or moon. On the other hand, if misalignment occurs, the source beam, as before, is split into two beams. One is reflected off the window in a misdirection; the other still passes through the window opening where it is retroreflected back to the window and again splits into two beams. One of the split beams returns to the source and the other is directed in a misaligned direction away from the eyes of the user. However, some of the misaligned source light which passes through the window illuminates a spot on the retroreflector. This spot is not retroreflected (since it is misaligned). Instead, it is reflected off the retroreflector to the specular surface where it is, in turn, reflected to the eye of the observer/user. Thus, the user sees the reflected spot on the specular surface. The reflected spot automatically appears in the direction of misalignment. The user is thereby guided to tilt the mirror in a direction toward the spot location so as to center the spot on the opening and thereby correct beam alignment. When the spot is centered on the opening, it appears as a bright blaze of light, since it is now a strong retroreflected beam of light.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

PREFERRED EMBODIMENT OF THE INVENTION

Figure 1:
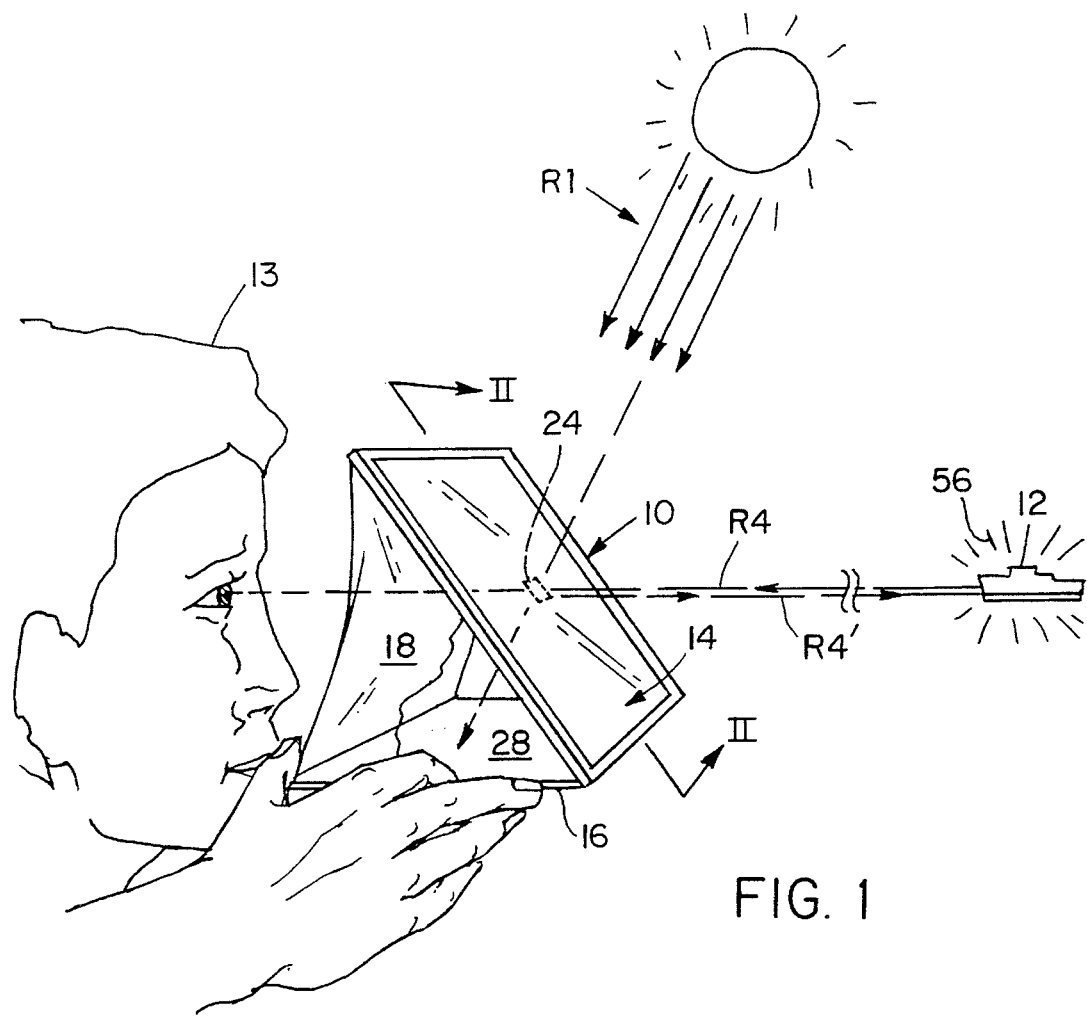
FIG. 1 is a schematic perspective, partially broken-away view of an apparatus of the invention.

Referring now to FIG. 1, there is shown a portable light signaling device 10 of the invention that, in this embodiment, uses rays of sunlight, indicated by the arrow R1, as the energy source for illuminating a target 12, such as a ship, by a user 13 to thereby signal the ship.

The signaling device consists of a mirror 14, a back platform 16 on which is mounted a sheeting of retroreflective prism material 28, and a pair of accordion-type support side panels 18 (one of which is shown partially broken away). The mirror 14 is preferably about 2½ inches wide by 4 inches high. As shown in section in FIG. 2, the mirror is a layered or sandwich-type structure consisting of a transparent dielectric substrate 20 with an opaque reflective coating or layer 22 on the back and a specular reflective coating or layer 26 over the reflective coating 22. Typically, the substrate 20 is formed of glass and the opaque reflective layer 22 is formed of a metal, such as, silver or gold. The specular reflective coating or layer 26 may comprise a glossy paint or mylar surface or other suitable light reflective surface. A central sight opening is provided in the two surfaces 22 and 26 leaving just a glass window 24 at the sight opening. About two inches below and behind the window 24 is a retroreflector sheet 28 provided on support platform 16. The retroreflector 28 is so placed that when the mirror 10 is approximately oriented to reflect a beam R1 of sunlight, the sun also shines through the opening 24 and onto the retroreflector 28. The glass window acts as a beam splitter. A portion R2 of the impinging beam R1 passes through the glass 20 to the retroreflector 28, while another portion R4 is reflected off the glass toward the target 12.

The split beam R2 upon retroreflection is labelled R2'. Beam R2' is returned to window 24 where it is again split into two beams. The path of one beam R4' is a parallel continuation of the sun's main mirror reflected beam R4.

When the user 13 aims the sunbeam at an object 12 while viewing the object 12 through the hole 24, the user will see a blaze of retroreflected light 56 coincident with the hole and target when the mirror is properly aligned with the object as shown in FIG. 1.

Figure 2:
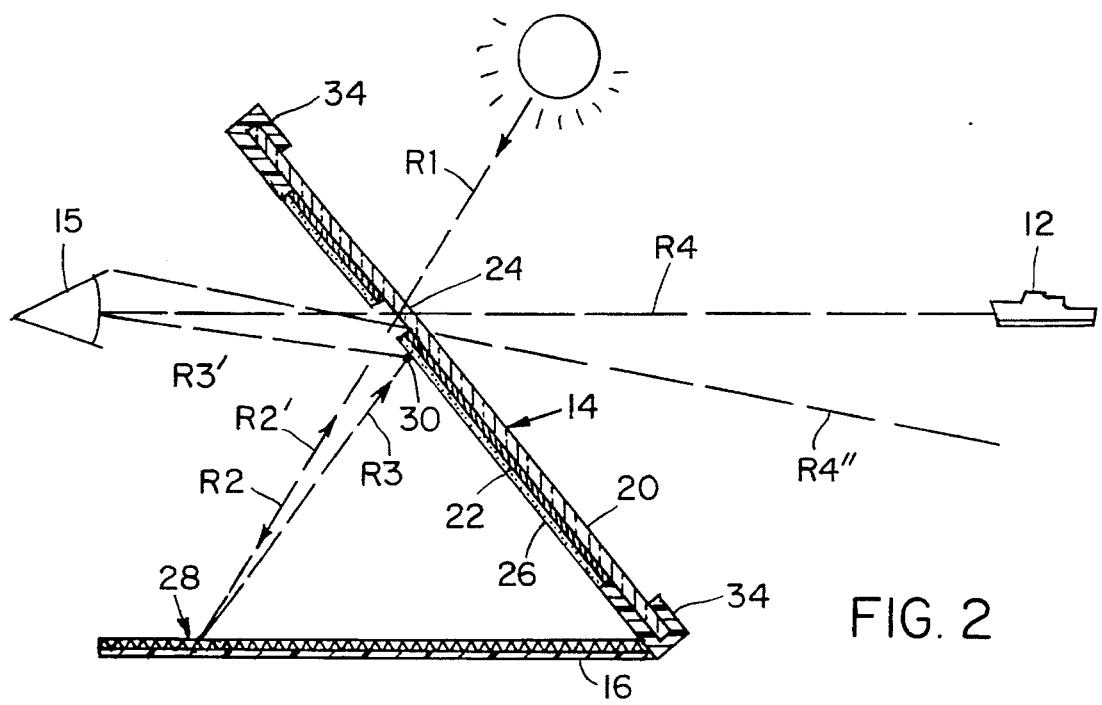
FIG. 2 is a schematic sectional view of the apparatus of FIG. 1 taken along lines II—II.

However, when the mirror 14 is misaligned with the target, as shown by the off target beam R4" in FIG. 2, a small spot of light 30 appears on the specular coating 26 away from the window 24. This spot 30 is formed by the sunlight R1 passing through the misaligned window 24 onto the retroreflector 28 and reflected along ray path R3 to the coating 26 where it is reflected as ray R3' to the eye 15 of the user 13.

The user, upon seeing the reflected spot 30, can easily correct the misalignment by tilting the mirror 10 until the spot 30 is moved to the window 24, whereupon the retroreflected blaze 56 from retroreflector 28 will appear on the target 12.

As previously indicated, the structural accordion-type side panels 18 may be so constructed that they can be unfolded in use, and the signaling device can be folded into a convenient flat package for storage when not in use. A protective frame 34 of plastic such as, polypropylene, is provided about the mirror 14. Preferably the specular coating is a high gloss paint or mylar strip.

The retroreflector is preferably made of commercial sheeting produced by Reflexite Corporation, but which is modified by applying a top coat lacquer over the face of the retroreflective sheeting. The lacquer absorbs most of the light, but the sheeting retains the characteristic high peak intensity at zero degree observation angle. Without this lacquer the blaze of retroreflected sunbeam, which is partially reflected off the window to the user, would be so bright in sunlight that it would blind or mask the target from the user.

An alternate moonlight embodiment is also contemplated wherein the above-described sunlight retroreflector is replaced by a retroreflector with no lacquer coating for moonlight use.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto. For example, the window 24 may be of any convenient geometric shape, a square being preferred because it is easier to make in a manual scraping process.

We claim:

1. A signaling device for signaling a target with light comprising:
   a. a mirror having a transparent dielectric substrate with a light reflective material thereon with a first opening in the material, such that some light impinging on the mirror is reflected by the substrate and some passes through the dielectric substrate at the opening;
   b. a retroreflector disposed adjacent to the dielectric substrate which retroreflector retroreflects the light passing through the opening; and
   c. a specular surface on the light reflective material around the opening, said specular surface reflecting to a user a visible spot produced on the retroreflector in a direction of misalignment in the event the retroreflected light is misaligned with the target, so that the user can readily align the retroreflected light with the target.

2. The device of claim 1 wherein the light is moonlight or sunlight.

3. The device of claim 1 wherein the retroreflector is a microprism retroreflector, the substrate is glass, and the light reflective material is opaque.

4. The device of claim 1 wherein the specular surface is comprised of high gloss black paint.

5. A sunlight signaling device for signaling a target with sunlight comprising:
   a. a mirror having a glass substrate with a light reflective material thereon with an opening in the material to provide a window, such that the window acts as a beam splitter to reflect some light impinging on the mirror while permitting some light to pass through the glass at the window;
   b. a retroreflector disposed below and behind the window to retroreflect the portion of the sunlight passing through the glass; and
   c. a specular reflective surface on the light reflective material around the window, said specular surface reflecting a visible spot on the retroreflector in a direction of misalignment in the event the retroreflected sunlight is misaligned with the target, which spot is reflected to a user so that the user can readily align the retroreflected light with the target.

6. The device of claim 5 including side panels for supporting the mirror in use.

7. The device of claim 6 wherein the side panels fold for storage.

8. The device of claim 5 wherein the specular surface is comprised of glossy black paint.

9. The device of claim 5 wherein the reflective material is comprised of silver, gold or platinum.

10. A method of signaling a target with light comprising the steps of:
    a. forming a mirror by applying a light reflective material to a transparent dielectric substrate;
    b. forming a first opening in the material, such that some light impinging on the mirror is reflected by the material and some passes through the dielectric substrate at the opening portion;
    c. disposing a retroreflector adjacent to the dielectric substrate to retroreflect the portion of the light passing through the opening to retroreflect the light;
    d. applying a specular surface on the light reflective material around the opening; and
    e. said specular surface reflecting to a user an illuminated spot on the retroreflector which appears in a direction of misalignment in the event the mirror is misaligned with the target, so that the user can readily align the light with the target.

11. A method of signaling a target with light comprising the steps of:
    a. forming an opening in a light reflective side of a mirror having a transparent side and a light reflective side, such that some light impinging on the mirror is reflected by the mirror and some passes through the transparent side at the opening;
    b. disposing a retroreflector adjacent to the mirror to retroreflect the light passing through the opening;
    c. applying a specular surface on the light reflective side around the opening, said specular surface reflecting to a user a visible spot on the retroreflector which appears in a direction of misalignment in the event the retroreflected light is misaligned with the target, which spot is reflected to a user so that the user can readily align the mirror with the target.

* * * * *